United States Patent [19]

Naito et al.

[11] Patent Number: 4,926,042

[45] Date of Patent: May 15, 1990

[54] METHOD OF AND DEVICE FOR DETECTING LIGHT RECEIVING POSITION UTILIZING OPTICAL FIBERS

[75] Inventors: Masamitsu Naito; Kenji Wada, both of Tokyo, Japan

[73] Assignee: Taisei Corporation, Tokyo, Japan

[21] Appl. No.: 232,999

[22] Filed: Aug. 17, 1988

Related U.S. Application Data

[63] Continuation-in-part of Ser. No. 207,627, Jun. 16, 1988, abandoned.

[30] Foreign Application Priority Data

Aug. 21, 1987 [JP] Japan .................. 62-208748

[51] Int. Cl.⁵ .................................. H01J 5/16
[52] U.S. Cl. .................. 250/227.11; 250/561
[58] Field of Search .............. 250/227, 561; 356/399, 356/400; 350/96.1

[56] References Cited

U.S. PATENT DOCUMENTS

| | | | |
|---|---|---|---|
| 3,937,952 | 6/1983 | Ripley et al. | 250/227 |
| 4,229,103 | 10/1980 | Hipp | 356/141 |
| 4,625,108 | 11/1986 | Nestel et al. | 250/227 |

Primary Examiner—David C. Nelms
Attorney, Agent, or Firm—Cushman, Darby & Cushman

[57] ABSTRACT

A method of detecting light receiving position utilizing optical fibers comprising: a plurality of light receiving surfaces each of which is formed by end surfaces of a plurality of optical fibers arranged straight, and which are arranged in parallel with each other to form rows which are divided into groups to form output ports; light receiving sensors each of which is formed by one light detection device, and which are connected to the corresponding groups, whereby laser beams from the light receiving surfaces are detected by the light receiving sensors through the optical fibers.

8 Claims, 7 Drawing Sheets 1a, 2a-16a ... OPTICAL FIBERS (THE FIRST ROW)
1b, 2b-16b ... OPTICAL FIBERS (THE SECOND ROW)
A, B, C AND D ... LIGHT RECEIVING SENSORS
a, b, c AND d ... LIGHT RECEIVING SENSORS
17 ... LIGHT RECEIVING SURFACE

FIG. 2
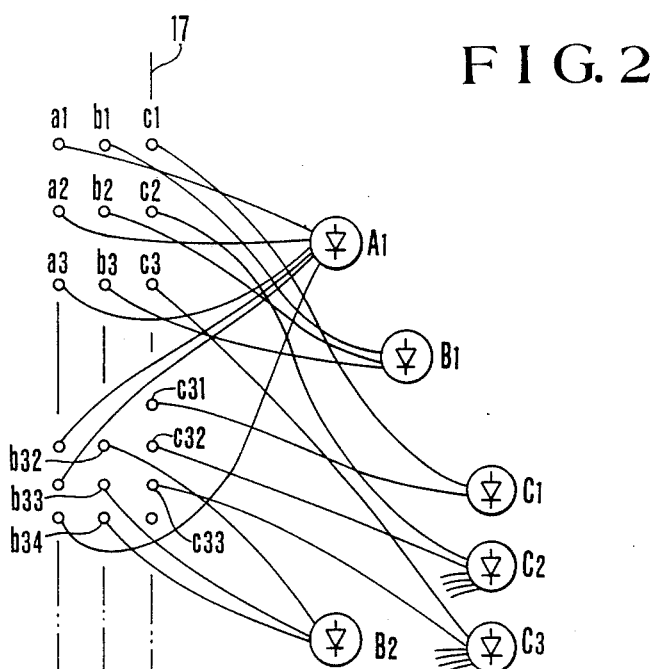
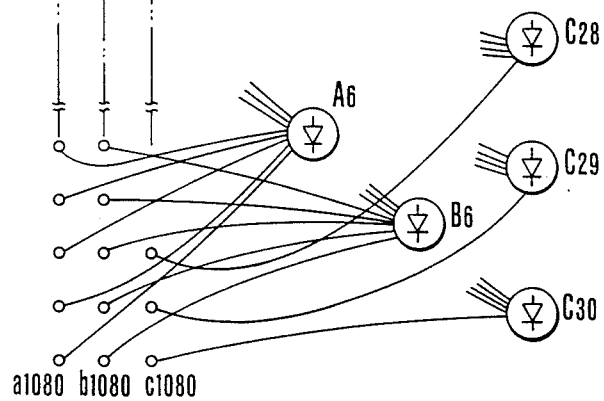
a1, a2-a1080 ... OPTICAL FIBERS (THE FIRST ROW)
b1, b2-b1080 ... OPTICAL FIBERS (THE SECOND ROW)
c1, c2-c1080 ... OPTICAL FIBERS (THE THIRD ROW)
A1, A2-A6 ... LIGHT RECEIVING SENSORS EACH RECEIVING 180 OPTICAL FIBERS
B1, B2-B6 ... LIGHT RECEIVING SENSORS EACH RECEIVING 30×6 OPTICAL FIBERS
C1, C2-C30 ... LIGHT RECEIVING SENSORS EACH RECEIVING 36 OPTICAL FIBERS a1, a2, a3 AND a4 ... OPTICAL FIBERS (GROUPS)
b1, b2, b3 AND b4 ... OPTICAL FIBERS (GROUPS)
c1, c2, c3 AND c4 ... OPTICAL FIBERS (GROUPS)
17 ... LIGHT RECEIVING SURFACE a1, b1, c1 AND d1-a8, b8, c8 AND d8 ... OPTICAL FIBERS
(a), (b), (c), (d), (e) AND (f) ... LIGHT RECEIVING SENSORS

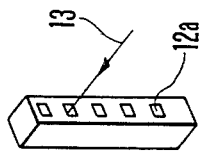
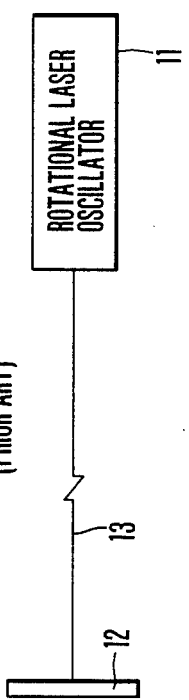
FIG.6 (PRIOR ART)
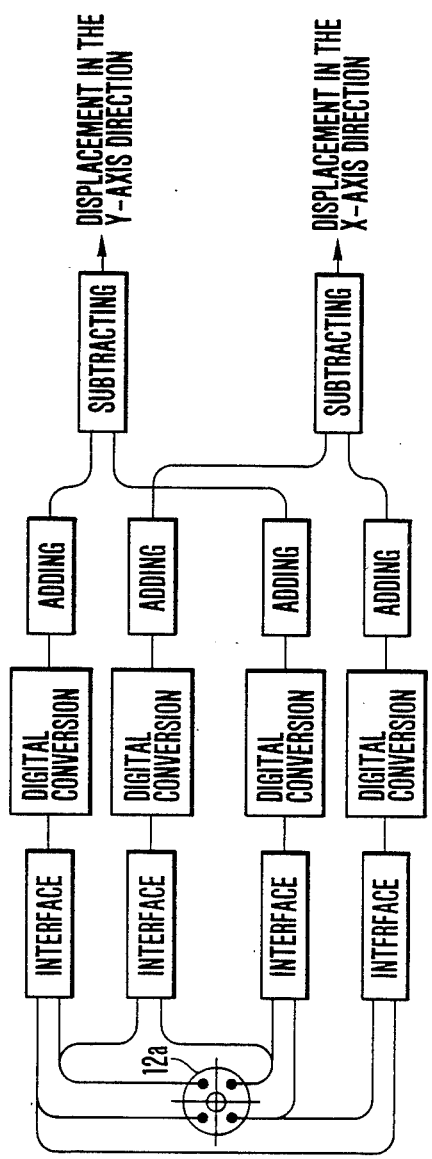
FIG.7 (PRIOR ART)
FIG.8 (PRIOR ART)

METHOD OF AND DEVICE FOR DETECTING LIGHT RECEIVING POSITION UTILIZING OPTICAL FIBERS

This is a continuation-in-part of U.S. Application No. 07/207,627 filed June 16, 1988, now abandoned.

BACKGROUND OF THE INVENTION

1. Industrial Field of the Invention

This invention relates to a so called method of detecting a light receiving position and a device for realizing the method which receives laser beams which have been projected and detects the positions of the projected laser beams when levelling or other surveys are conducted with the laser beams.

2. Related Art

There is a known art in which levelling or horizontal measuring is conducted utilizing the linear propagation characteristic of laser beams.

The above-described art is exemplified by a method, for example, as shown in FIG. 6, in which a laser beam 13 is applied to a light-receiving plate 12 which is disposed at a certain distance from a rotational laser oscillator 11 so that the level difference between the laser oscillator 11 and the light-receiving plate 12 is measured. It is further exemplified by an art in which a reference line is disposed and measuring depending upon this reference line is conducted.

FIG. 7 shows a light position detector which is formed in such a manner that a light-receiving plate 12a is divided into four pieces in X and Y directions, this light position detector representing the structure of laser beam position detection for use in, for example, automatic level detectors for motor graders or bulldozers which finish roads or runways.

A conventional laser beam receiving plate or a plate which is irradiated with the laser beams in general includes, as a photosensor, a semiconductor diode that is a light detecting device called a photodiode for converting the intensity of the received laser beam into an electric signal.

FIG. 8 shows an example of a light receiving sensor called a separation type for use in one-dimensional measurement such as levelling.

Such a separation type of light receiving sensor is provided with five photodiodes at vertical intervals in the order of millimeters, the photodiodes each having a light receiving surface 12a on the surface thereof.

As described above, in the conventional light receiving plate or the plate irradiated with light, when it is used for one-dimensional measurement, and large displacements in the span of measurement are intended to be measured, the number of the light detecting devices to be disposed needs to necessarily be increased.

For example, when the position of a laser beam applied at a certain position on an article of one meter in length is intended to be measured in precision of a millimeter unit, a light receiving plate is needed to be formed in such a manner that a light detecting device divided into 1,000 pieces is mounted in case of the conventional separate type of light receiving sensor. Namely, very large number of light detecting devices are required.

As an alternative to the above-described separation type of light receiving sensor, there is a non-separation type of light receiving sensor in which the difference in resistance is detected depending upon the incident position of a laser beam. However, since it involves unevenness of intensity and spread of the luminous point of laser beams, the calibration becomes complicated. Therefore it is not suitable for use as a measuring instrument. Furthermore, the accompanying processing circuit becomes complicated, and comprises an analog circuit. Therefore a problem arises in that sufficient precision cannot be obtained.

Furthermore, the size of one light receiving sensor reaches several centimeters. Therefore in case of measurement in an elongated span, a multiplicity of the non-separation type light receiving sensors needs to be connected for use, causing the cost of the device to become very large.

As described above, in case a large one-dimensional measuring span is required, a problem arises in that a multiplicity of very expensive light receiving sensors are needed to be used.

As an alternative to the above-described means, a method for use in two-dimensional measurement is known in which an image obtained by a CCD or image pickup tube is processed so that the incident position of a laser beam is detected. However, when the number of pixels are increased for the purpose of improving precision, several tens of seconds to several minutes are taken for processing one frame. Therefore it is not suitable for use in high speed processing, and is impractical.

In any of the above-described methods, in case where the region to be measured is widened in one or two-dimensional manners, the number of requisite light detecting devices becomes large. As a result of this, problems arise in that light receiving plate or plate irradiated with light have an exceedingly high cost, and also its processing circuit becomes complicated.

Therefore a group including the inventor of the present invention found a method in which the number of photodiodes is decreased by way of connecting light-branching device comprising a plurality of output ports (see U.S. Application No. 07/207,627 filed June 16, 1988 Japanese Patent Publication No. 082442/1987).

FIG. 9 illustrates the basic structure of the method in which reference numerals 1 to 16 represent optical fibers, reference numeral 17 represents a light receiving surface formed by the edges of the optical fibers 1 to 16, and reference numerals 1A to 16A represent light branching devices connected to the corresponding optical fibers 1 to 16. Reference numerals 1a, 1b to 16a and 16b represent output ports of the corresponding light branching devices 1A to 16A. Symbols A, B, C and D represent light receiving sensors.

However, the method in which the light branching devices 1A to 16A are employed involves a problem in uniformly branching the light. Furthermore the cost of the light branching devices 1A to 16A is relatively high. Therefore a problem arises in that the total cost of the device cannot be reduced although the number of the photodiodes can be decreased.

Therefore a group including the inventor of the present invention studied for the purpose of achieving a method of and device for detecting the light receiving position wit low cost which can overcome the above problems experienced, and in which the measured range is wide, and precise and high speed detection of the laser beam receiving positions can be conducted even if the area to be measured is wide.

As a result of this, the following method of and device for detecting light receiving positions can be obtained.

SUMMARY OF THE INVENTION

The method of and device for detecting light receiving position is characterized in that: light receiving surfaces are formed by disposing in a straight form several rows of one side end surfaces of a plurality of optical fibers; the rows of the optical fibers are each divided into a plurality of groups; and light receiving sensor formed by one light detecting device is connected to each group, whereby a laser beam from the light receiving surface is detected by the light receiving sensors through the optical fibers.

Furthermore, a device for realizing the method of detecting the light receiving position is characterized in that:

light receiving surfaces formed by disposing a plurality of rows of one side end surfaces of a plurality of optical fibers in a straight form, said optical fibers forming said light receiving surfaces being divided into groups on each row; and light receiving sensors formed by one light receiving device each of which is connected to each group.

Since the method and device described above are employed, the number of the light detecting devices, that is, the light receiving sensors can be reduced unlike conventional methods and devices. As a result of this, the accompanying electronic circuit can be made simplified, and high speed processing can be realized without any delay in processing speed.

BRIEF DESCRIPTION OF THE DRAWINGS

FIG. 2 is a structural view of a device according to an embodiment in which three rows each formed by 1,080 optical fibers are disposed;

FIG. 6 illustrates a basic principle of the measuring method with a laser beam;

FIG. 7 illustrates a basic structure when displacements in X-Y axial direction are measured with a laser beam;

FIG. 8 illustrates a separation type light receiving sensor for use in one-dimensional levelling.

DESCRIPTION OF PREFERRED EMBODIMENTS

An embodiment according to the present invention will be specifically described. In this embodiment, a case is described in which a one-dimensional measuring light receiving plate is employed which forms a device for detecting the height of a laser beam which rotates horizontally.

Figure 1:
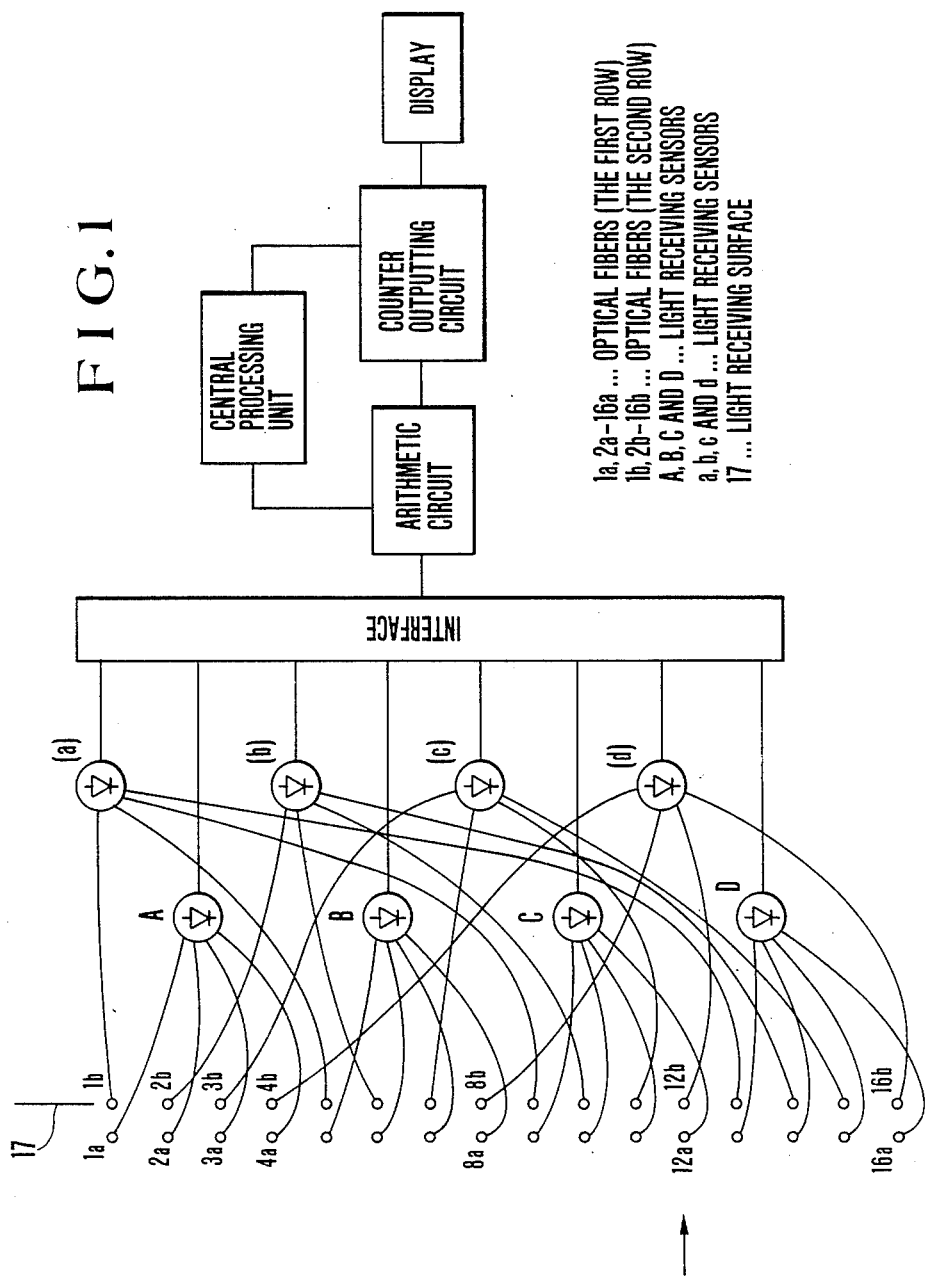
FIG. 1 illustrates a light receiving position detecting device utilizing optical fibers according to an embodiment of the present invention, in which two rows of end surfaces of the optical fibers are disposed vertically to form a light receiving surface.

FIG. 1 shows a light receiving surface 17 formed by two rows of end surfaces of optical fibers in such a manner that sixteen optical fibers $1a, 2a, \ldots, 16a$ are disposed to form a row with each one end surface arranged vertically and another row is disposed adjacent to the former row. Reference numerals $1b, 2b, \ldots, 16b$ represent the optical fibers forming the second row.

Output ports of the sixteen optical fibers $1a, 2a, \ldots, 16a$ disposed vertically to form the first row, are divided into groups in such a manner that four ports form a group starting from the top one thereof. The thus-formed groups are connected to four light receiving sensors represented by symbols A, B, C and D, respectively.

The optical fibers $1b, 2b, \ldots, 16b$ forming the second row which is disposed adjacent to the first row formed by the optical fibers $1a, 2a, \ldots, 16a$ are divided into groups in such a manner that four fibers consisting of every fourth fiber form a group starting from the top one thereof. The thus-formed groups each has output port connected to the corresponding light receiving sensor among four light receiving sensors (a), (b), (c), (d), as a result of which, a light receiving plate is formed. More generally, each group has n elements where n is 4 in this embodiment.

As shown in FIG. 1, the optical fibers $1a, 2a, \ldots, 16a$ and the optical fibers $1b, 2b, \ldots, 16b$ are disposed to form a plurality of rows in such a manner that the end surfaces thereof are positioned close each other to form a straight light receiving surface 17. As a result of this, if a laser beam is received by the twelfth optical fiber counted from the top one, as shown by the arrow in FIG. 1, the beam is made incident upon the optical fibers $12a$ and $12b$ so that it is detected by the light receiving sensor C and the light receiving sensor (d). As a result of this, the signal obtained from these light receiving sensors is caused to be input to an interface. Then the signal is processed in an arithmetic circuit, a central processing unit CPU and counter outputting circuit. Consequently, the signal is displayed by a display showing the light receiving position, that is, the result of measurement.

Figure 9:
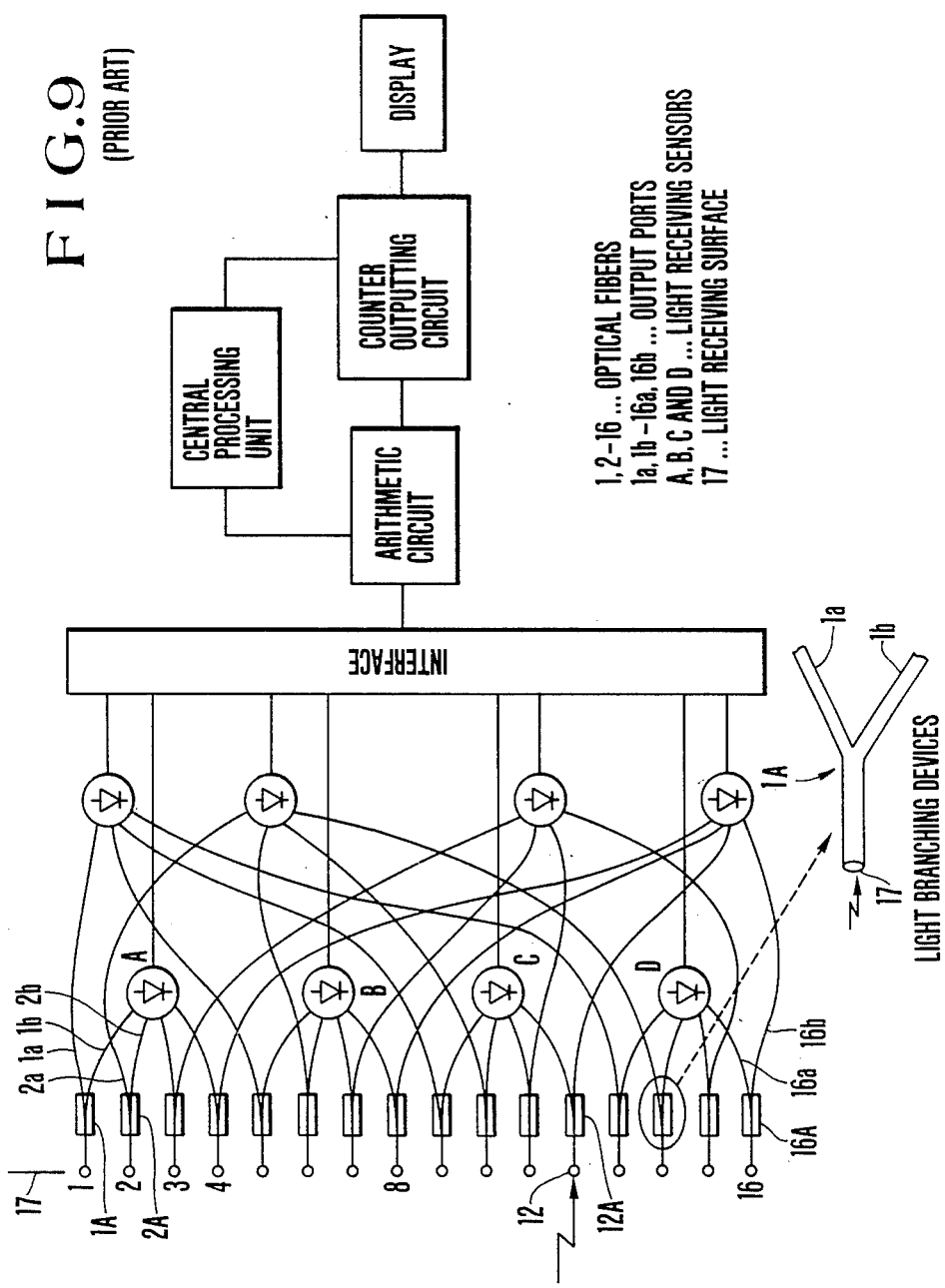
FIG. 9 is a basic structural view illustrating a conventional example for use in case where light branching device is used in order to decrease the number of photodiodes which serve as light receiving sensors.

In the method of FIG. 9, sixteen light receiving sensors are used corresponding to sixteen optical fibers $1a$ to $16a$, and $1b$ to $16b$, however, only eight light receiving sensors can detect the laser beam position by way of, as described above, dividing the output ports of the optical fibers $1a$ to $16a$ and $1b$ to $16b$ into groups.

Furthermore, as shown in FIG. 2, in case a light receiving plate for one-dimensional measurement is formed by a straight light receiving surface 17 which is formed in such a manner that groups each formed by 1,080 optical fibers are arranged to form three rows in a manner of a straight line, precise measurement can be conducted only by a further smaller number of light receiving sensors. That is, the optical fibers on each row, that is, $a_1$ to $a_{1080}$, $b_1$ to $b_{1080}$ and $c_1$ to $c_{1080}$ are divided into groups, the groups each having an output port to which the light receiving sensor is connected. For example, the $a_1$-row at the first row is divided into 180 optical fibers by bundling, each group being connected with one of light receiving sensors $A1, A2, \ldots, A6$.

The optical fibers of the second row: $b_1$-row are divided into groups each formed by 180 optical fibers by way of repetition of bundling 30 optical fibers, having 150 optical fibers, and bundling the next 30 optical fibers. Each group is connected with one of light receiving sensors B1, B2, ..., B6.

The optical fibers of the third $c_1$-row are divided into groups each formed by 36 optical fibers by picking up one optical fiber at intervals at 30 optical fibers. The group forms an output port to which one light receiving sensor of C1, C2, ..., C30 is connected. That is, a group is formed by 36 output ports. The all optical fibers are divided into 30 groups each of which is connected with one light receiving sensor.

In a manner described above in which the light receiving sensors A, B and C are connected to the corresponding rows, total of 42 light receiving sensors are sufficient to form a light receiving plate formed by a very large number: 1,080 optical fibers per row in the above-described embodiment. The reason for setting the number of the groups of the optical fibers to 30 lies in that since the diameter of the laser beam increases in accordance with increase in the distance, interposition of the beams is intended to be prevented. The first and the second rows may be formed in such a manner that the number of the optical numbers is reduced to an extent to be within one piece in each group depending upon the minimum diameter of the laser beam, causing the number of optical fibers used to be reduced.

Figure 3:
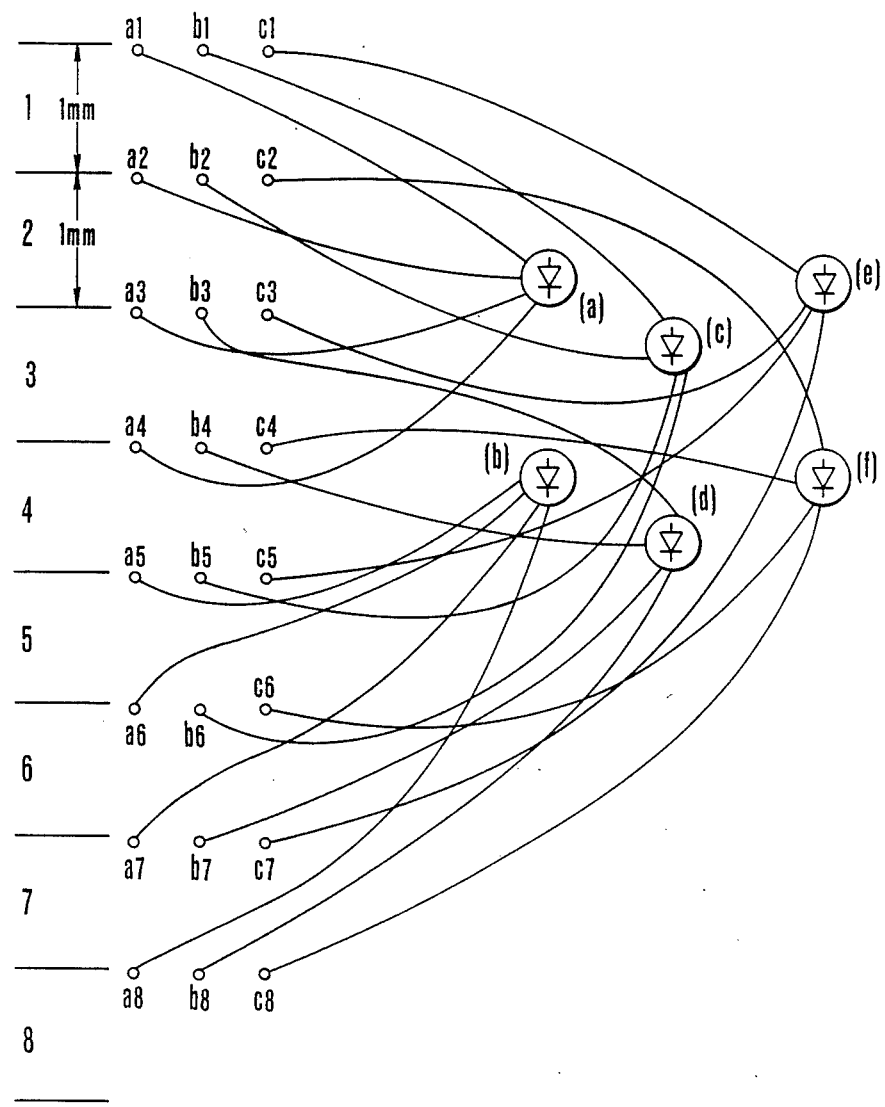
FIG. 3 is a structural view illustrating a manner for dividing the optical fibers shown in FIG. 2 into groups according to another embodiment.
Figure 4:
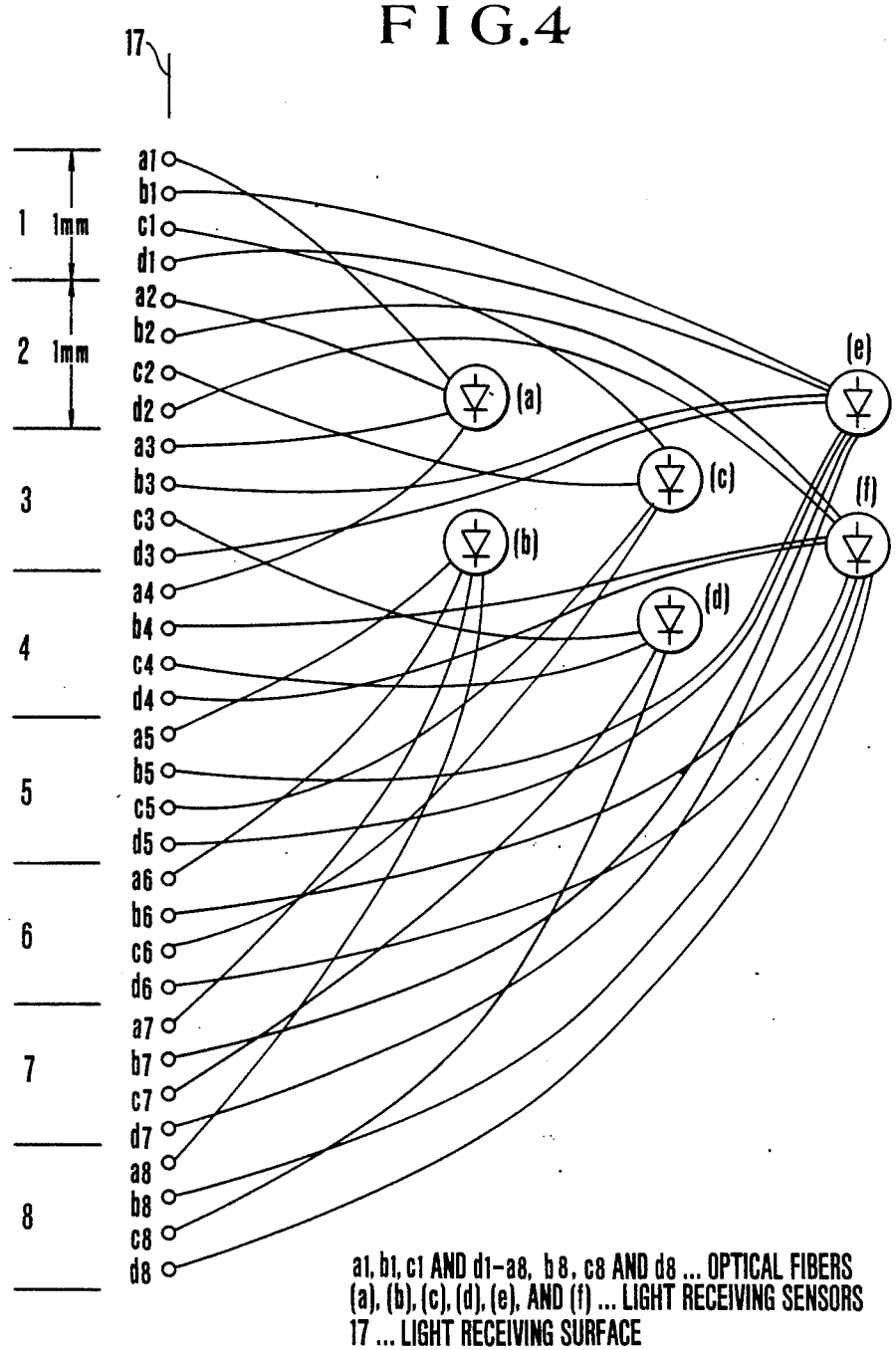
FIG. 4 is a structural view illustrating an embodiment in which the end surfaces of optical fibers are disposed vertically to form a row, and the optical fibers are divided into groups each comprising four optical fibers.
Figure 5:
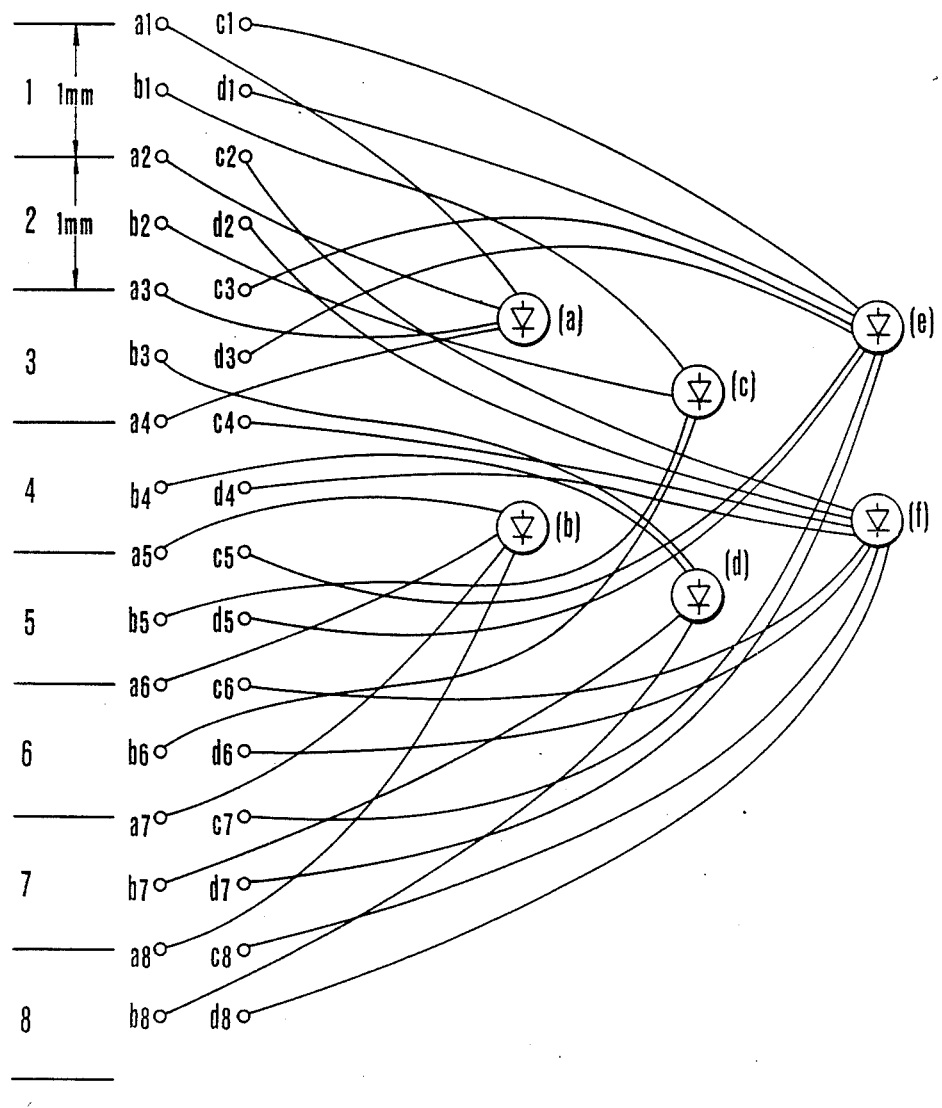
FIG. 5 illustrates an embodiment in which two vertical rows of the optical fibers shown in FIG. 4 are arranged.

FIGS. 3, 4 and 5 illustrate embodiments in which the arrangement of end surfaces of optical fibers and the division of output sides into groups are varied. There are manners available such as a manner in which optical fibers are vertically divided into groups and a manner in which combination with the above-described manner.

FIG. 3 illustrates an embodiment in which optical fibers forming $a_1$, $b_1$ and $c_1$ are divided into groups each of which is formed by four optical fibers counted from the top one. FIG. 4 illustrates an embodiment in which the end surfaces of the optical fibers are vertically arranged to form a row, and the optical fibers are divided into groups each of which is formed by four optical fibers consisting of every fourth fiber counted from the top one. FIG. 5 illustrates an embodiment in which the optical fibers of FIG. 4 are arranged to form two rows.

The method of and device for detecting the light receiving position with the use of optical fibers is formed, as described above, in such a manner that one side end surfaces of a plurality of optical fibers are arranged to form several straight rows so that a light receiving surface is formed. Furthermore, the output sides of the optical fibers are divided into output ports each of which is connected with one light receiving sensor so that a laser beam received by the light receiving surface is arranged to be detected through the optical fibers. Therefore the following advantages can be obtained in comparison to the conventional method of detection:

(1) The number of light receiving sensors can be significantly reduced.

(2) An accompanying electric circuit can be simplified in structure, as a result of which high speed processing can be realized.

(3) Since expensive light branching devices are not employed, the cost of the total device can be reduced.

(4) Since the number of the light receiving sensors are reduced, the function and the accuracy of the measuring method are improved, the cost of the device can be significantly reduced, and an improvement and development in technology can be obtained in a field of measurement in which optical technology is utilized.

What is claimed is:

1. A method of detecting a light receiving position utilizing optical fibers comprising the steps of:
   disposing end surfaces of a plurality of optical fibers which form light receiving surfaces in a straight line;
   disposing said light receiving surfaces to form a plurality of rows;
   dividing each of said rows into groups, each having a plurality of light receiving surfaces, to serve as output ports;
   connecting light receiving sensors, each formed by one light detecting device, to each divided group; and
   detecting laser beams from said light receiving surfaces by said light receiving sensors through said optical fibers.

2. A device for detecting a light receiving position utilizing optical fibers comprising:
   a plurality of light receiving surface, each said surface formed by one end surface of an optical fiber, said plurality of surfaces disposed in a straight line and formed into rows, each row forming said light receiving surfaces divided into a plurality of groups each of which includes a plurality of light receiving surfaces; and
   a light receiving sensor, formed by one light receiving device, connected to each said group for detecting light therefrom.

3. A method as in claim 1, wherein said disposing in rows step includes disposing at least two of said end surfaces at each of a plurality of locations, and said dividing step includes choosing groups from which each said location can be determined.

4. A method as in claim 3, wherein there are two groups, each group has n, where n is an integer, elements, a first group having n consecutive elements and a second group having every n th element.

5. A device as in claim 2, wherein said end surfaces are disposed at each of a plurality of locations, and said groups are formed such that each said location can be determined.

6. A device as in claim 5, wherein there are two groups, each group has n, where n is an integer, elements, a first group having n consecutive elements and a second group having every n th element.

7. A device for detecting a light position, comprising:
   a plurality of light receiving surfaces, each formed by an end surface of an optical fiber, and arranged into at least two substantially parallel and straight rows;
   at least two groups of light sensors, each said group of light sensors associated with each of said substantially parallel rows, each element of said group connected to a plurality of said light receiving surfaces of said associated row; and
   interface and processing means, connected to said groups of light sensors, for determining a position of light incidence based on outputs of said light sensors.

8. A device as in claim 7, wherein there are two of said rows, each light sensor is connected to n, where n is an integer, elements, said first group connected tto n consecutive elements and said second group connected to every n th element.

* * * * *